United States Patent
Hidaka et al.

(10) Patent No.: US 8,060,266 B2
(45) Date of Patent: Nov. 15, 2011

(54) MODE CHANGEOVER CONTROL DEVICE FOR A HYBRID VEHICLE

(75) Inventors: Terumasa Hidaka, Atsugi (JP);
Munetoshi Ueno, Atsugi (JP);
Katsuyuki Saito, Hadano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1000 days.

(21) Appl. No.: 11/958,622

(22) Filed: Dec. 18, 2007

(65) Prior Publication Data

US 2008/0154455 A1    Jun. 26, 2008

(30) Foreign Application Priority Data

Dec. 26, 2006  (JP) .................................. 2006-349851
Sep. 18, 2007  (JP) .................................. 2007-240878

(51) Int. Cl.
*G06F 19/00* (2006.01)

(52) U.S. Cl. ......................................... 701/22; 180/65.3

(58) Field of Classification Search .................... 701/22, 701/93, 112; 180/65.27, 65.25, 65.8, 65.3, 180/65.1, 65.2, 65.21; 477/2
See application file for complete search history.

(56) References Cited

U.S. PATENT DOCUMENTS

| | | | | |
|---|---|---|---|---|
| 4,405,029 A | * | 9/1983 | Hunt | 180/65.25 |
| 4,470,476 A | * | 9/1984 | Hunt | 180/65.25 |
| 4,533,011 A | * | 8/1985 | Heidemeyer et al. | 180/65.25 |
| 5,614,857 A | * | 3/1997 | Lim et al. | 327/205 |
| 5,846,155 A | | 12/1998 | Taniguchi et al. | |
| 6,123,163 A | * | 9/2000 | Otsu et al. | 180/65.8 |
| 6,234,932 B1 | * | 5/2001 | Kuroda et al. | 477/3 |
| 6,428,444 B1 | | 8/2002 | Tabata | |
| 6,879,902 B2 | * | 4/2005 | Nada | 701/93 |
| 7,099,757 B2 | * | 8/2006 | Niki et al. | 701/22 |
| 7,597,164 B2 | * | 10/2009 | Severinsky et al. | 180/65.27 |
| 2001/0004027 A1 | | 6/2001 | Masaki | |
| 2004/0249518 A1 | | 12/2004 | Okoshi et al. | |
| 2005/0155803 A1 | | 7/2005 | Schiele | |

FOREIGN PATENT DOCUMENTS

| | | | |
|---|---|---|---|
| DE | 102 04 982 A1 | | 8/2003 |
| DE | 10260435 | * | 7/2004 |
| DE | 10 2004 040 315 A1 | | 3/2006 |
| EP | 1 375 237 A2 | | 1/2001 |
| EP | 1 447 583 A1 | | 8/2004 |
| JP | HEI 6-48190 | | 2/1994 |
| JP | HEI 11-082260 | | 3/1999 |

* cited by examiner

*Primary Examiner* — Thomas Black
*Assistant Examiner* — Marthe Marc-Coleman
(74) *Attorney, Agent, or Firm* — Young Basile

(57) ABSTRACT

A mode changeover control device for a hybrid vehicle includes an engine, a motor/generator and at least one driving wheel. A changeover between an electric drive mode using only the electric motor to power the at least one driving wheel and a hybrid drive mode using both the engine and the electric motor to power the at least one driving wheel is controlled. The drive mode is changed from the hybrid drive mode to the electric drive mode if the accelerator opening is less than a first threshold level, and the drive mode is changed from the electric drive mode to the hybrid drive mode if the accelerator opening is greater than a second threshold level. A hysteresis value is defined between the first threshold level and the second threshold level, and the hysteresis value is changed based on a vehicle operating state.

20 Claims, 4 Drawing Sheets

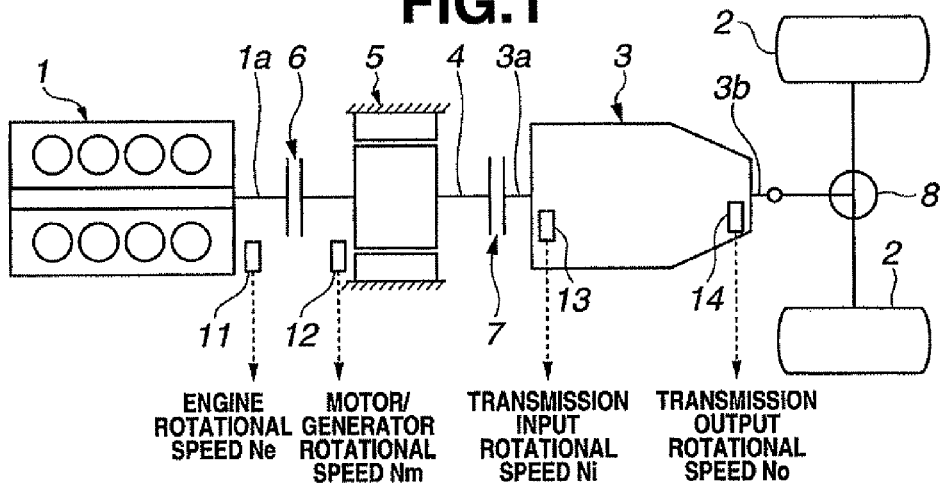
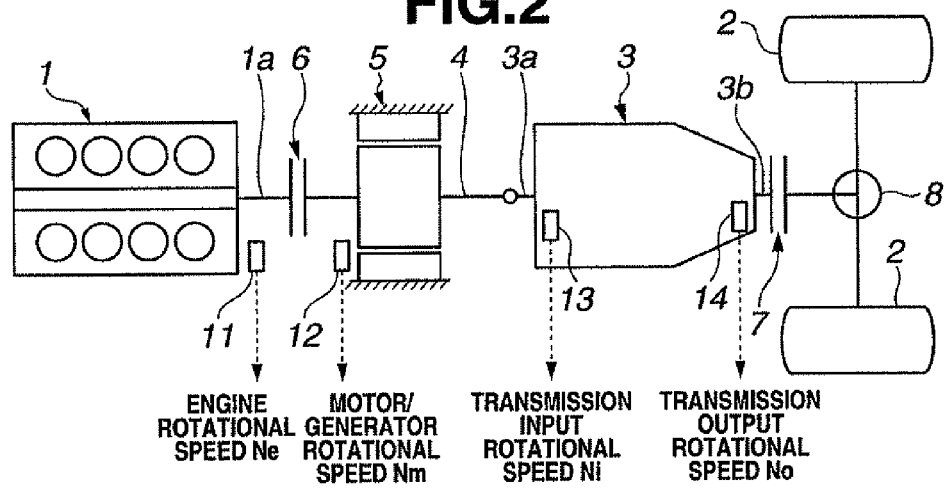
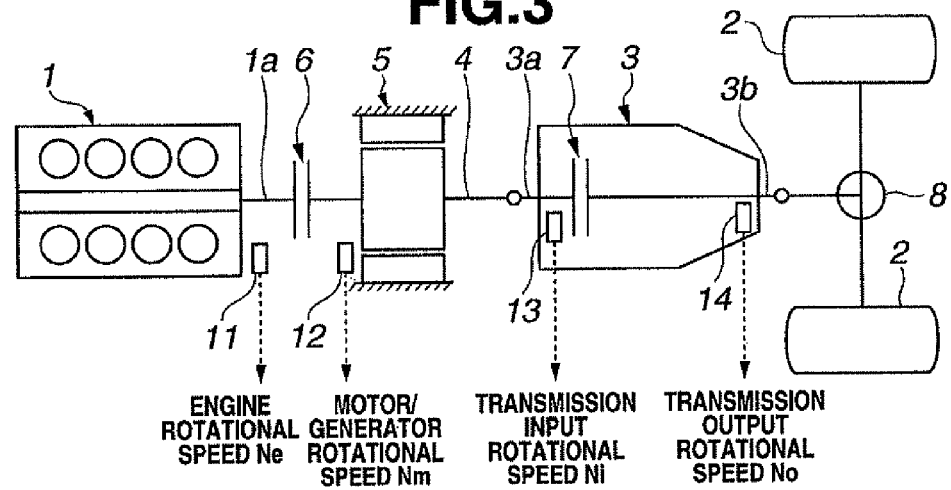

MODE CHANGEOVER CONTROL DEVICE FOR A HYBRID VEHICLE

CROSS-REFERENCE TO RELATED APPLICATIONS

This application claims priority from Japanese Patent Application Serial Nos. 2006-349851, filed Dec. 26, 2006, and 2007-240878, filed Sep. 18, 2007, each of which is incorporated herein in its entirety by reference.

TECHNICAL FIELD

The invention relates to the field of hybrid vehicles, and more particularly, the invention relates to a mode changeover control device for a hybrid vehicle.

BACKGROUND

Typical hybrid vehicles are equipped with an engine and a electric motor as propulsion sources so as to allow a changeover between an electric drive mode (EV mode, motor drive mode) in which the vehicle is propelled only by the electric motor and a hybrid drive mode (HRV mode, combination drive mode) in which the vehicle is propelled by both the engine and the electric motor. In order to switch between the electric drive mode and the hybrid drive mode, various hybrid vehicle mode changeover control devices have been proposed.

For example, Japanese Laid-Open Patent Publication No. 6-48190 discloses a mode changeover control device that causes a changeover to the HEV mode from the EV mode when the accelerator opening exceeds an EV-to-HEV mode changeover judgment threshold level. When the vehicle is operating in the HEV mode, the mode changeover control device causes a changeover to the EV mode when the accelerator opening decreases below an HEV-to-EV mode changeover judgment threshold level. In order to prevent frequent changeovers between the EV mode and the HEV mode, the EV-to-HEV mode changeover judgment level is set higher than HEV-to-HV mode changeover judgment level so as to provide hysteresis between these judgment threshold levels.

BRIEF SUMMARY

Control devices and methods for a hybrid vehicle including an engine, a motor/generator and at least one driving wheel are taught herein. The hybrid vehicle is operable in an electric drive mode in which the vehicle is powered only by the motor/generator and a hybrid drive mode in which the vehicle is powered by both the engine and the motor/generator. One example of a control system taught herein comprises a controller configured to set a first threshold level of an accelerator opening, set a second threshold level of the accelerator opening, wherein a hysteresis value is defined between the first threshold level and the second threshold level, change the hysteresis value based on at least one of a vehicle operating state and a driving environment, receive a signal corresponding to the accelerator opening, initiate a changeover from the hybrid drive mode to the electric drive mode if the accelerator opening is less than the first threshold level and initiate a changeover from the electric drive mode to the hybrid drive mode if the accelerator opening is greater than the second threshold value.

Variations of this embodiment and other embodiments are described in more detail hereinafter.

BRIEF DESCRIPTION OF DRAWINGS

The description herein makes reference to the accompanying drawings wherein like reference numerals refer to like parts throughout the several views, and wherein:

FIG. 1 is a block diagram showing the power train of a first hybrid vehicle in which embodiments of the invention can be incorporated;

FIG. 2 is a block diagram showing the power train of a second hybrid vehicle in which embodiments of the invention can be incorporated;

FIG. 3 is a block diagram showing the power train of a third hybrid vehicle in which embodiments of the invention can be incorporated;

DETAILED DESCRIPTION OF EMBODIMENTS OF THE INVENTION

Figure 4:
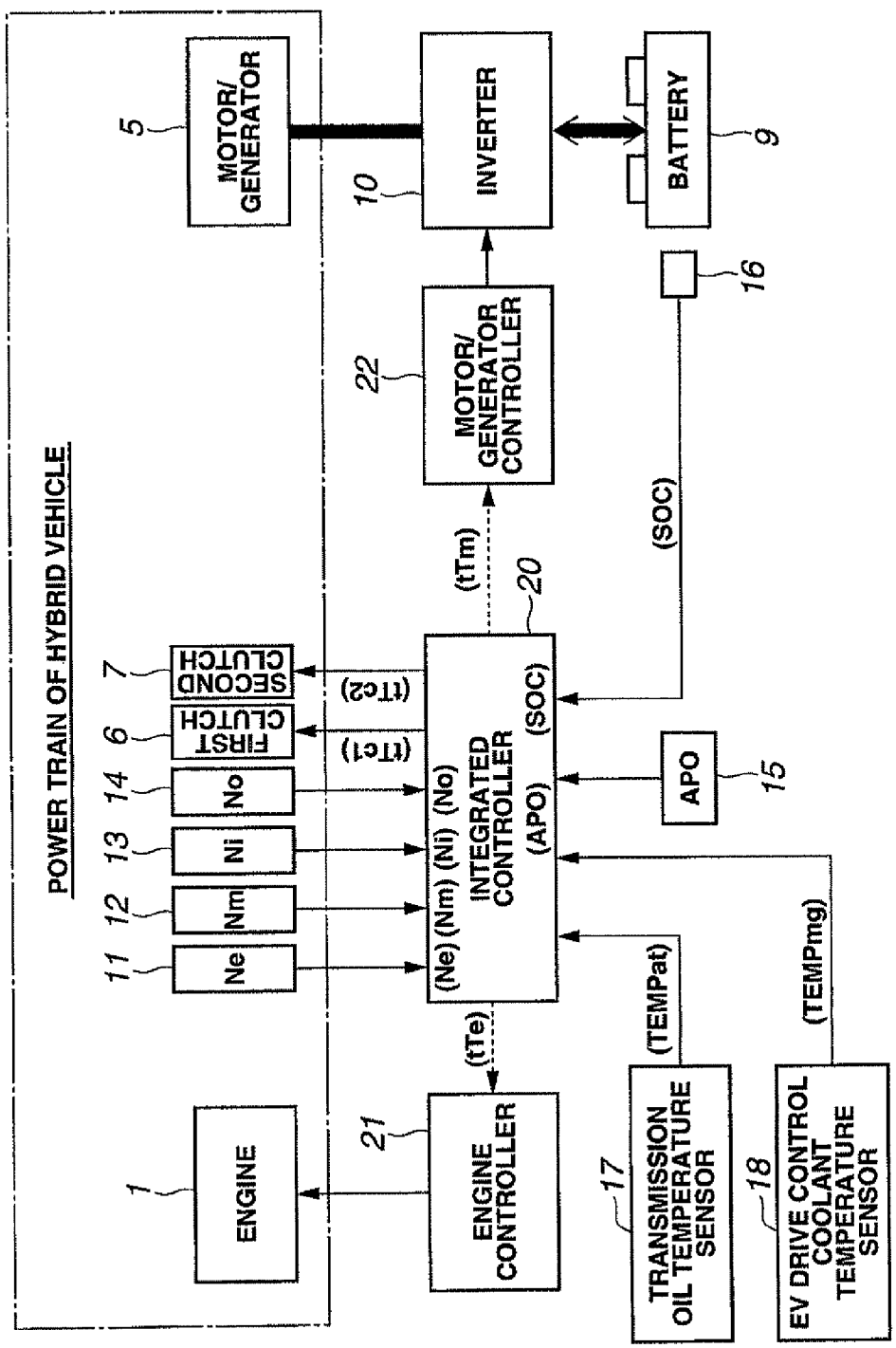
FIG. 4 is a block diagram showing a control system according to an embodiment of the invention.

Hereinafter, exemplary embodiments of the invention are described below in detail with reference to the drawings.

FIG. 1 is a first exemplary power train for use in a front-engine, rear-wheel-drive hybrid vehicle with a hybrid drive system in which a mode changeover control device according to embodiments of the invention can be incorporated. This power train includes an engine 1, an automatic transmission 3 arranged in tandem on the vehicle rear side of engine 1 and connected to a pair of driving wheels, namely left and right rear wheels 2 of the vehicle, as in the case of an ordinary rear-wheel drive vehicle, a shaft 4 disposed between engine 1 and automatic transmission 3 to transmit the torque of engine 1 (crankshaft 1*a*) to an input shaft 3*a* of automatic transmission 3 and electric motor 5 connected to shaft 4. Herein, electric motor 5 functions both as a motor and a generator as is referred to as motor/generator 5.

The power train shown in FIG. 1 also includes a first clutch 6 disposed between engine 1 and motor/generator 5, and more specifically between engine crankshaft 1*a* and shaft 4, to selectively engage and disengage engine 1 and motor/generator 5. First clutch 6 is designed to change a transmission torque capacity and, for example, can be a wet-type multiple disc clutch capable of changing the transmission torque capacity by controlling its hydraulic operating oil flow amount and pressure continuously using a proportional solenoid.

The power train further includes a second clutch 7 disposed between motor/generator 5, and more specifically between shaft 4 and transmission input shaft 3*a*, to establish connection or disconnection between motor/generator 5 and automatic transmission 3. Second clutch 7 is also designed to change a transmission torque capacity and, for example, can be a wet-type multiple disc clutch capable of changing the transmission torque capacity by controlling its hydraulic operating oil flow amount and pressure continuously using a proportional solenoid.

Automatic transmission 3 has a plurality of friction elements, such as clutches and brakes, to define a transmission path (i.e., select a gear stage) by selective engagement and disengagement of these friction elements. In particular, automatic transmission 3 changes the torque of input shaft 3a at a gear ratio in accordance with the selected gear stage and outputs the resulting torque to output shaft 3b so that the output torque is distributed to left and right rear wheels 2 by a differential gear unit 8 for vehicle driving. It should be understood, however, that automatic transmission 3 is not limited to the above-mentioned multi-speed transmission. For example, automatic transmission 3 may be a continuously variable transmission.

In response to the demand for an electric drive (EV) mode at low-load, low-speed vehicle driving, e.g., where the vehicle starts from a standstill, the power train disengages first clutch 6, engages second clutch 7 and places automatic transmission 3 into a power transmission state. When motor/generator 5 is driven in this state, only the output torque of motor/generator 5 is input to transmission input shaft 3a. Automatic transmission 3 changes the torque of input shaft 3a at a gear ratio in accordance with the selected gear stage and outputs the resulting torque to transmission output shaft 3b. The torque of transmission output shaft 3b is transmitted to rear wheels 2 through differential gear unit 8. The vehicle is thus powered only by motor/generator 5 during electric driving (EV driving).

On the other hand, in response to the demand for a hybrid drive, or HEV mode, during high-load, high-speed vehicle driving, the power train engages both first clutch 6 and second clutch 7 and places automatic transmission 3 into the power transmission state. The rotation of engine 1 increases with the torque of motor/generator 5 by engagement of first clutch 6 so that engine makes a start for changeover from the EV mode to the HEV mode. In this state, both the output torque of engine 1 and the output torque of motor/generator 5 are input to input shaft 3a of automatic transmission 3. Automatic transmission 3 changes the torque of input shaft 3a at a gear ratio in accordance with the selected gear stage and outputs the resulting torque to output shaft 3b of automatic transmission 3. The torque of output shaft 3b of automatic transmission 3 is transmitted to rear wheels 2 through differential gear unit 8. The vehicle is thus powered by both engine 1 and motor/generator 5 when the vehicle is operated in HEV mode.

When the vehicle is operated in HEV mode, there may be excess energy when engine 1 is operated at optimum fuel consumption. In such a case, motor/generator 5 performs its generator function to convert the excess energy into electrical power, which is stored for subsequent use by the motor/generator 5 to improve the fuel consumption of engine 1.

Although second clutch 7 is disposed between motor/generator 5 and automatic transmission 3 to selectively engage and disengage motor/generator 5 and vehicle driving wheels 2 as shown in the first exemplary power train in FIG. 1, in a second exemplary power train, the second clutch 7 may alternatively be disposed between automatic transmission 3 and differential gear unit 8 as shown in FIG. 2.

Further, although the dedicated second clutch 7 is disposed on the front or rear side of automatic transmission 3 in the first and second exemplary power trains of FIGS. 1 and 2, respectively, in a third exemplary power train one of the friction elements of automatic transmission 3 may be used as second clutch 7 as shown in FIG. 3. In this case, second clutch 7 is engaged to perform its mode changeover function and to place automatic transmission 3 in the power transmission state. It is thus possible to eliminate second clutch 7 and thereby reduce the cost of the power train.

Any of the first, second and third exemplary power trains shown in FIGS. 1-3, may be controlled by a control system as shown in FIG. 4. Although the control system is applicable to all of these power trains, as well as other power trains not shown, the following explanation is made with particular regard to the third exemplary power train shown in FIG. 3 wherein one of the friction elements of automatic transmission 3 is used as second clutch 7.

The control system of FIG. 4 has an integrated controller 20 to control the operation points of the power train. The power train operation points are herein defined by a target torque tTe of engine 1, a target torque tTm of motor/generator 5, a target transmission torque capacity tTc1 of first clutch 6 and a target transmission torque capacity tTc2 of second clutch 7. Integrated controller 20 is, for example, a microcomputer including a random access memory (RAM), a read-only memory (ROM) and a central processing unit (CPU) in addition to various input and output connections. Generally, the control functions described herein are performed by execution by the CPU of one or more software programs stored in ROM. Of course, some or all of the functions of integrated controller 20 can be implemented by hardware components.

In order to determine the power train operation points, integrated controller 20 receives a signal from an engine rotation sensor 11 for detecting a rotational speed Ne of engine 1, a signal from motor/generator rotation sensor 12 for detecting a rotational speed Nm of motor/generator 5, a signal from a transmission input rotation sensor 13 for detecting a rotational speed Ni of transmission input shaft 3a, a signal from a transmission output rotation sensor 14 for detecting a rotational speed No of transmission output shaft 3b, a signal from an accelerator opening sensor 15 for detecting an accelerator pedal depression amount (accelerator opening APO) corresponding to a requested load of engine 1, a signal from a storage state sensor 16 for detecting a stage of charge SOC of a battery 9 (or an amount of electrical power that can be taken out of battery 9), a signal from a transmission oil temperature sensor 17 for detecting an operating oil temperature TEMPat of automatic transmission 3 corresponding to a temperature of second clutch 7 and a signal from an electric drive control coolant temperature sensor 18 for detecting a coolant temperature TEMPmg of an electric drive control system, namely motor/generator 5 in combination with an inverter 10. Herein, engine rotation sensor 11, motor/generator rotation sensor 12, transmission input rotation sensor 13 and transmission output rotation sensor 14 can be arranged as shown in FIGS. 1 to 3.

Based on the accelerator opening APO, the battery charge state SOC and the transmission output rotational speed No (vehicle speed VSP), integrated controller 20 carries out vehicle drive control operation by selecting either the EV mode or the HEV mode to achieve a vehicle driving force according to a driver's request and calculating the target engine torque tTe, the target motor/generator torque tTm, the target first clutch transmission torque capacity tTc1 and the target second clutch transmission torque capacity tTc2. In particular, the target engine torque tTe is output by integrated controller 20 to engine controller 21 so that engine controller 21 controls engine 1 to adjust the actual engine torque Te to the target engine torque tTe. The target motor/generator torque tTm is output from integrated controller 20 to motor/generator controller 22 so that motor/generator controller 22 controls motor/generator 5 using battery 9 and inverter 10 to adjust the actual motor/generator torque Tm to the target motor/generator torque tTm. Integrated controller 20 further supplies solenoid control currents to first and second clutches 6 and 7 in order to adjust the actual torque transmission capacities Tc1 and Tc2 to the target torque transmission capacities tTc1 and tTc2, respectively, for individual clutch engagement control.

Figure 5:
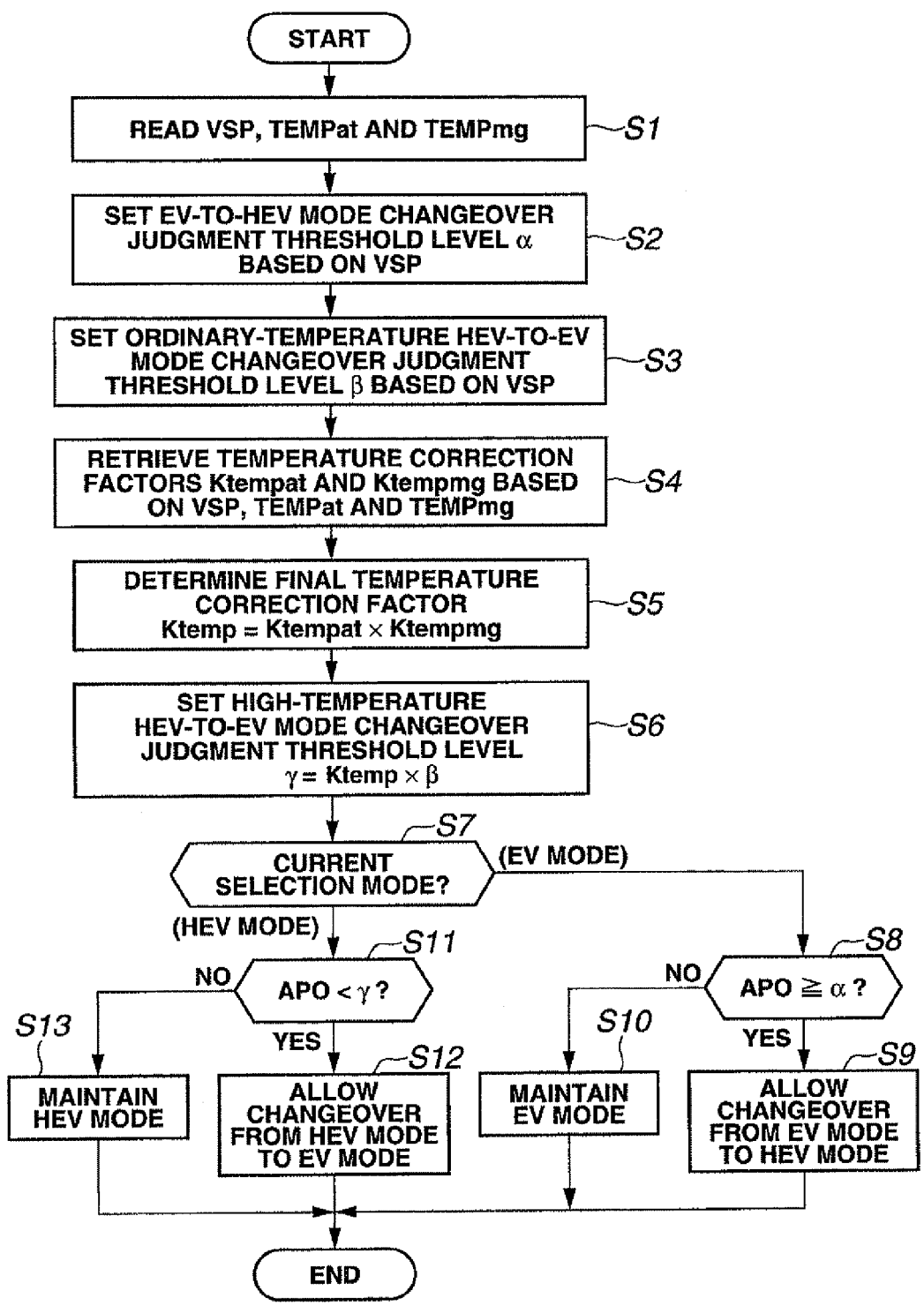
FIG. 5 is a flow chart showing a mode changeover control program according to an embodiment of the invention.

Integrated controller 20 is configured to control mode changeover (mode selection) between the EV mode and the HEV mode by executing a control program such as that shown in the flowchart of FIG. 5.

At step S1 integrated controller 20 reads vehicle speed VSP, transmission oil temperature TEMPat and electric drive control coolant temperature TEMPmg.

Figure 6:
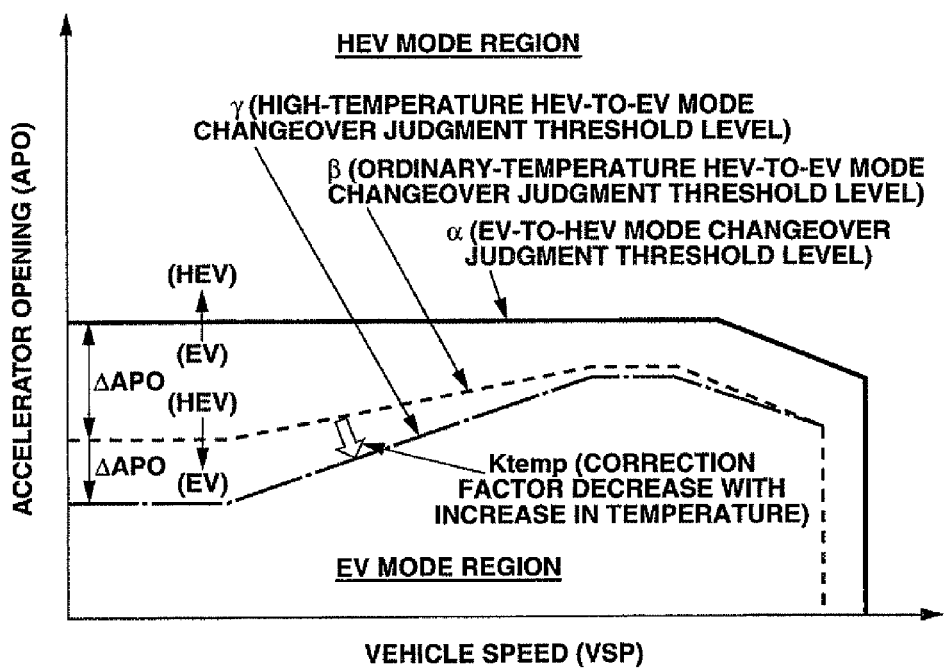
FIG. 6 is a diagram showing a control characteristic with an EV mode region and a HEV mode region for the mode changeover control program according to FIG. 5.

At step S2 integrated controller 20 sets an EV-to-HEV mode changeover judgment accelerator opening threshold level α based on an EV-to-HEV mode changeover judgment accelerator opening threshold line as indicated by a solid line in FIG. 6.

The EV-to-HEV mode changeover judgment threshold line (level α) is used to judge whether to allow a changeover from the EV mode to the HEV mode when the accelerator opening APO becomes greater than or equal to the judgment threshold level α at a respective vehicle speed VSP. As shown in FIG. 6, the EV-to-HEV mode changeover judgment threshold level α is set constant irrespective of the vehicle speed VSP within a given vehicle speed range. Herein, the EV-to-HEV mode changeover judgment threshold level α corresponds to an upper limit of the accelerator opening APO, with respect to each vehicle speed VSP, at which motor/generator 5 can be operated for EV driving so as to preserve a sufficient motor torque for engine start at the time of changeover from the EV mode to the HEV mode, and can be predetermined, for example, by experimentation. If the accelerator opening APO is greater than the EV-to-HEV mode changeover judgment threshold line (level α) during the EV mode, motor/generator 5 uses a large torque to rotate driving wheels 2 and cannot produce a sufficient torque to start engine 1 at the changeover from the EV mode to the HEV mode. This results in a failure of the changeover from the EV mode to the HEV mode.

At step S3 integrated controller 20 sets an ordinary-temperature HEV-to-EV mode changeover judgment accelerator opening threshold level β based on an ordinary-temperature HEV-to-EV mode changeover judgment accelerator opening threshold line as indicated by a broken line in FIG. 6.

The ordinary-temperature HEV-to-EV mode changeover judgment threshold line (level β) is used to judge whether to allow a changeover from the HEV mode to the EV mode with engine stop when the accelerator opening APO becomes smaller than the judgment threshold level β with respect to each vehicle speed VSP under ordinary temperature conditions after warm-up. The ordinary-temperature HEV-to-EV mode changeover judgment threshold level β is set lower than the HEV-to-EV mode changeover judgment threshold level α, so that there is hysteresis ΔAPO between these judgment threshold levels α and β. In this embodiment, the ordinary-temperature HEV-to-EV mode changeover judgment threshold line (level β) is lowered with respect to the HEV-to-EV mode changeover judgment threshold line (level α) in such a manner that the amount (width) of hysteresis ΔAPO increases as the vehicle speed decreases, as explained hereinafter. The ordinary-temperature HEV-to-EV mode changeover judgment threshold level β decreases at a constant gradient with respect to the vehicle speed in FIG. 6, but may alternatively decrease in a non-constant manner, for example, in steps.

At step S4 integrated controller 20 retrieves an oil temperature correction factor Ktempat (0<Ktempat≦1), relative to the ordinary-temperature HEV-to-EV mode changeover judgment threshold line (level β), based on the vehicle speed VSP and the transmission oil temperature TEMPat (i.e., the temperature of second clutch 7). Also at step S4, integrated controller 20 retrieves a coolant temperature correction factor Ktempmg (0<Ktempmg≦1), relative to the ordinary-temperature HEV-to-EV mode changeover judgment threshold line (level β), based on the vehicle speed VSP and electric drive control coolant temperature TEMPmg (i.e., the temperature of electric drive control system including motor/generator 5 and inverter 10). Both of the oil temperature correction factor Ktempat and the coolant temperature correction factor Ktempmg decrease with increase in temperature and decrease with vehicle speed.

At step S5 integrated controller 20 multiplies the oil temperature correction factor Ktempat by the coolant temperature correction factor Ktempmg to determine a final temperature correction factor Ktemp (wherein Ktemp=Ktempat× Ktempmg) relative to the ordinary-temperature HEV-to-EV mode changeover judgment threshold line (level β).

At step S6 integrated controller 20 multiplies the ordinary-temperature HEV-to-EV mode changeover judgment threshold line (level β) by the final temperature correction factor Ktemp to set a high-temperature HEV-to-EV mode changeover judgment threshold level γ (wherein γ=β× Ktemp).

As mentioned above, both the oil temperature correction factor Ktempat (0<Ktempat≦1) and the coolant temperature correction factor Ktempmg (0<Ktempmg≦1) decrease with increases in temperature and decrease with vehicle speed. The final temperature correction factor Ktemp (0<Ktemp≦1), which is obtained by multiplying Ktempat by Ktempmg, also decreases with increases in temperature and decreases with vehicle speed. As a result, the high-temperature HEV-to-EV mode changeover judgment threshold level γ, which is given by correction of the ordinary-temperature HEV-to-EV mode changeover judgment level β with the correction factor Ktemp (that is, γ=β×Ktemp), shows such a characteristic as indicated by a chain line in FIG. 6 at a certain combination of the transmission oil temperature TEMPat (the temperature of second clutch 7) and the electric drive control coolant temperature TEMPmg (the temperature of electric drive control system including motor/generator 5 and inverter 10).

From the foregoing, it is seen that the amount of hysteresis ΔAPO between the EV-to-HEV mode changeover judgment threshold line (level α) and the high-temperature HEV-to-EV mode changeover judgment threshold line (level γ) is made larger than that between the EV-to-HEV mode changeover judgment threshold line (level α) and the ordinary-temperature HEV-to-EV mode changeover judgment threshold line (level β). This hysteresis ΔAPO increases with the transmission oil temperature TEMPat (the temperature of second clutch 7) and the electric drive control coolant temperature TEMPmg (the temperature of the electric drive control system including motor/generator 5 and inverter 10) and increases with decrease in the vehicle speed VSP. Needless to say, the high-temperature HEV-to-EV mode changeover judgment threshold line (level γ) coincides with the ordinary-temperature HEV-to-EV mode changeover judgment threshold line (level β) when the correction factor Ktemp is set to 1 at ordinary temperature.

At step S7 integrated controller 20 judges whether the current selection mode is in either the EV mode or the HEV mode.

If it is judged at step S7 that the EV mode is selected, integrated controller 20 checks at step S8 whether the accelerator opening APO is greater than or equal to the EV-to-HEV mode changeover judgment threshold level α.

If APO≧α, integrated controller 20 allows a changeover from the EV mode to the HEV mode at step S9. If APO<α, integrated controller 20 maintains the currently selected EV mode at step S10.

If it is judged at step S7 that the HEV mode is selected, integrated controller 20 checks at step S11 whether the accelerator opening APO is smaller than the high-temperature HEV-to-EV mode changeover judgment threshold level γ (which coincides with the ordinary-temperature HEV-to-EV mode changeover judgment threshold level β at ordinary temperature).

If APO<γ, integrated controller 20 allows a changeover from the HEV mode to the EV mode at step S12. If APO≧γ, integrated controller 20 maintains the currently selected HEV mode at step S13.

As explained above, the mode changeover control device of this embodiment is configured to allow a changeover from the EV mode to the HEV mode when the EV-to-HEV mode changeover condition of APO≧α is satisfied and allows a changeover from the HEV mode to the EV mode when the HEV-to-EV mode changeover condition of APO<γ is satisfied, while changing the amount of accelerator opening hysteresis ΔAPO (wherein ΔAPO=α-γ) between the EV-to-HEV mode changeover condition and the HEV-to-EV mode changeover condition depending on the vehicle operating state (vehicle speed VSP) and driving environment (temperatures TEMPat and TEMPmg). The following effects can be obtained by such a configuration.

Where there is a tendency that the accelerator opening APO changes by a large degree, such as is experienced during low-speed, city driving, the hysteresis ΔAPO (wherein ΔAPO=α-γ) is set to a large amount with respect to the low vehicle speed VSP as shown in FIG. 6. This prevents frequent changeovers from the EV mode to the HEV mode accompanied by starting of the engine and from the HEV mode to the EV mode accompanied by stopping of the engine in response to large accelerator opening changes. Thus, it is possible to reduce deteriorations in vehicle fuel efficiency and driving performance that would be caused by frequent mode changeovers.

During high-speed driving, where there is a tendency that the accelerator opening changes slightly, such as is experienced during suburban or highway driving, the hysteresis ΔAPO (wherein ΔAPO=α-γ) is set to a small amount with respect to the high vehicle speed VSP as shown in FIG. 6 so as to readily allow mode changeovers in response to small accelerator opening changes. This makes it possible to ensure changeover to the EV mode when the motor/generator torque and the battery charge state SOC (dischargeable battery power) are sufficient for EV driving. Thus, improved fuel efficiency and performance of the hybrid vehicle can be obtained.

The accelerator opening hysteresis ΔAPO is changed depending on not only the vehicle speed conditions (vehicle operating state) but also the vehicle driving environment (temperatures TEMPat and TEMPmg) so that the hysteresis ΔAPO increases as the transmission oil temperature TEMPat (the temperature of second clutch 7) becomes higher than the ordinary temperature and increases as the electric drive control coolant temperature TEMPmg (the temperature of electric drive control system including motor/generator 5 and inverter 10) becomes higher than the ordinary temperature. This reduces the tendency to select the EV mode in which the electric drive control system including motor/generator 5 and inverter 10 is put under high load when the temperature of the electric drive control system is elevated, as well as reducing the frequency of changeovers between the HEV mode and the EV mode when the temperature of second clutch 7 is elevated due to clutch slip control against engine start shock. The temperature increases of the electric drive system and second clutch 7 can be thus limited to prevent damage to the electric drive system and early deterioration of second clutch 7 and its operating oil.

Further, the hysteresis ΔAPO (wherein ΔAPO α-γ) is changed depending on the vehicle operating state (vehicle speed VSP) and driving environment (temperatures TEMPat and TEMPmg) as shown in FIG. 6 by adjusting the HEV-to-EV mode changeover judgment threshold level β, γ while the EV-to-HEV mode changeover judgment level α remains constant. This produces the following effect.

The EV-to-HEV mode changeover judgment threshold level α generally corresponds to the upper limit of the accelerator opening APO at which motor/generator 5 can be operated for EV driving so as to preserve a sufficient motor torque for engine start at the time of changeover from the EV mode to the HEV mode. If the accelerator opening APO is greater than the EV-to-HEV mode changeover judgment threshold level α under the EV mode, motor/generator 5 uses a large torque to rotate driving wheels 2 and cannot produce a sufficient torque to start engine 1 at the changeover from the EV mode to the HEV mode. This results in a failure of the changeover from the EV mode to the HEV mode. Namely, motor/generator 5 cannot start engine 1 and cannot allow changeover from the EV mode to the HEV mode if the hysteresis ΔAPO (wherein ΔAPO=α-γ) is increased by shifting the EV-to-HEV mode changeover judgment threshold level α in a greater accelerator opening direction.

In this embodiment, however, the hysteresis ΔAPO (wherein ΔAPO=α-γ) is changed by adjusting the HEV-to-EV mode changeover judgment threshold level β, γ rather than the EV-to-HEV mode changeover judgment threshold level α. The above detriment can be thus avoided.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control device for a hybrid vehicle including an engine, a motor/generator, and at least one driving wheel, the hybrid vehicle operable in an electric drive mode in which the vehicle is powered only by the motor/generator and a hybrid drive mode in which the vehicle is powered by both the engine and the motor/generator, the control device comprising:
   a controller configured to:
      set a first threshold level of an accelerator opening;
      set a second threshold level of the accelerator opening, wherein a hysteresis value is defined between the first threshold level and the second threshold level;
      change the hysteresis value based on at least one of a vehicle operating state and a driving environment, wherein the at least one of the vehicle operating state and the driving environment includes a temperature of an electric drive control system including the motor/generator, and the controller is configured to change the hysteresis value by increasing the hysteresis value as the temperature of the electric drive control system including the motor/generator increases;
      receive a signal corresponding to the accelerator opening;

initiate a changeover from the hybrid drive mode to the electric drive mode if the accelerator opening is less than the first threshold level; and initiate a changeover from the electric drive mode to the hybrid drive mode if the accelerator opening is greater than the second threshold value.

2. The control device according to claim 1 wherein the at least one of the vehicle operating state and the driving environment includes a vehicle speed; and wherein the controller is further configured to change the hysteresis value by increasing the hysteresis value as the vehicle speed decreases.

3. The control device according to claim 2 wherein the controller is further configured to change the hysteresis value by adjusting the first threshold level based on the at least one of the vehicle operating state and the driving environment.

4. The control device according to claim 3 wherein the second threshold level remains unchanged in response to a change in the hysteresis value.

5. A control device for a hybrid vehicle including an engine, a motor/generator, and at least one driving wheel, the hybrid vehicle operable in an electric drive mode in which the vehicle is powered only by the motor/generator and a hybrid drive mode in which the vehicle is powered by both the engine and the motor/generator, the control device comprising:
a controller configured to:
set a first threshold level of an accelerator opening;
set a second threshold level of the accelerator opening, wherein a hysteresis value is defined between the first threshold level and the second threshold level;
change the hysteresis value based on at least one of a vehicle operating state and a driving environment;
receive a signal corresponding to the accelerator opening;
initiate a changeover from the hybrid drive mode to the electric drive mode if the accelerator opening is less than the first threshold level; and
initiate a changeover from the electric drive mode to the hybrid drive mode if the accelerator opening is greater than the second threshold value, wherein the at least one of the vehicle operating state and the driving environment includes a vehicle speed and the hysteresis value is changed by increasing the hysteresis value as the vehicle speed decreases.

6. The control device according to claim 5 wherein the controller is further configured to change the hysteresis value by adjusting the first threshold level based on the at least one of the vehicle operating state and the driving environment.

7. The control device according to claim 6 wherein the second threshold level remains unchanged in response to a change in the hysteresis value.

8. The control device according to claim 5 wherein the controller is further configured to change the hysteresis value by decreasing the first threshold level with vehicle speed and maintaining the second threshold level at a constant value regardless of the vehicle speed.

9. The control device according to claim 8 wherein the hybrid vehicle further comprises a first clutch disposed between the engine and the motor/generator to change a torque transmission capacity between the engine and the motor/generator and a second clutch disposed between the motor/generator and the at least one driving wheel to change a torque transmission capacity between the motor/generator and the at least one driving wheel; and wherein the control system further comprises:
the controller configured to initiate the changeover to the electric drive mode by signaling disengagement the first clutch and engagement of the second clutch and to initiate the changeover to the hybrid drive mode by signaling engagement of the first clutch and the second clutch; and wherein
the controller configured to change the hysteresis value by increasing the hysteresis value as the temperature of the second clutch increases.

10. The control device according to claim 5 wherein the controller is configured to change the hysteresis value by increasing the hysteresis value as the temperature of an electric drive control system including the motor/generator increases.

11. A control device of a hybrid vehicle including an engine, a motor/generator, and at least one driving wheel, the hybrid vehicle operable in an electric drive mode in which the vehicle is powered only by the motor/generator and a hybrid drive mode in which the vehicle is powered by both the engine and the motor/generator, the control system comprising:
means for setting a first threshold level of an accelerator opening;
means for setting a second threshold level of the accelerator opening, wherein a hysteresis value is defined between the first threshold level and the second threshold level;
means for changing the hysteresis value based on the temperature of an electric drive control system including the motor/generator;
means for receiving a signal corresponding to the accelerator opening;
means for initiating a changeover from the hybrid drive mode to the electric drive mode if the accelerator opening is less than the first threshold level; and
means for initiating a changeover from the electric drive mode to the hybrid drive mode if the accelerator opening is greater than the second threshold value.

12. A method for controlling a hybrid vehicle including an engine, a motor/generator, and at least one driving wheel, the hybrid vehicle operable in an electric drive mode in which the vehicle is powered only by the motor/generator and a hybrid drive mode in which the vehicle is powered by both the engine and the motor/generator, the method comprising:
setting a first threshold level of an accelerator opening;
setting a second threshold level of the accelerator opening, wherein a hysteresis value is defined between the first threshold level and the second threshold level;
changing the hysteresis value based on at least one of a vehicle operating state and a driving environment by decreasing the first threshold level with vehicle speed based on a total amount of a change to the hysteresis value and maintaining the second threshold level unchanged in response to the change to the hysteresis value;
receiving a signal corresponding to the accelerator opening;
initiating a changeover from the hybrid drive mode to the electric drive mode if the accelerator opening is less than the first threshold level; and
initiating a changeover from the electric drive mode to the hybrid drive mode if the accelerator opening is greater than the second threshold value.

13. The method according to claim 12 wherein the at least one of the vehicle operating state and the driving environment includes a vehicle speed; and wherein changing the hysteresis value further comprises increasing the hysteresis value as the vehicle speed decreases.

14. The method according to claim 13 wherein changing the hysteresis value further comprises:

increasing the hysteresis value as the temperature of an electric drive control system including the motor/generator increases.

15. The method according to claim 12 wherein the hybrid vehicle further comprises a first clutch disposed between the engine and the motor/generator to change a torque transmission capacity between the engine and the motor/generator and a second clutch disposed between the motor/generator and the at least one driving wheel to change a torque transmission capacity between the motor/generator and the at least one driving wheel, the method further comprising:

initiating the changeover to the electric drive mode by signaling disengagement the first clutch and engagement of the second clutch; and initiating the changeover to the hybrid drive mode by signaling engagement of the first clutch and the second clutch; and wherein changing the hysteresis value by increasing the hysteresis value as the temperature of the second clutch increases.

16. A method for controlling a hybrid vehicle including an engine, a motor/generator, and at least one driving wheel, the hybrid vehicle operable in an electric drive mode in which the vehicle is powered only by the motor/generator and a hybrid drive mode in which the vehicle is powered by both the engine and the motor/generator, the method comprising:

setting a first threshold level of an accelerator opening;

setting a second threshold level of the accelerator opening, wherein a hysteresis value is defined between the first threshold level and the second threshold level;

changing the hysteresis value based on at least one of a vehicle operating state and a driving environment;

receiving a signal corresponding to the accelerator opening;

initiating a changeover from the hybrid drive mode to the electric drive mode if the accelerator opening is less than the first threshold level; and initiating a changeover from the electric drive mode to the hybrid drive mode if the accelerator opening is greater than the second threshold value, wherein the at least one of the vehicle operating state and the driving environment includes a vehicle speed and the hysteresis value is changed by increasing the hysteresis value as the vehicle speed decreases.

17. The method according to claim 16 wherein changing the hysteresis value further comprises:

adjusting the first threshold level based on the at least one of the vehicle operating state and the driving environment.

18. The method according to claim 17 wherein changing the hysteresis value further comprises:

increasing the hysteresis value as the temperature of an electric drive control system including the motor/generator increases.

19. The method according to claim 16 wherein changing the hysteresis value further comprises:

decreasing the first threshold level with vehicle speed based on a total amount of a change to the hysteresis value; and maintaining the second threshold level unchanged in response to the change to the hysteresis value.

20. The method according to claim 16 wherein changing the hysteresis value further comprises:

increasing the hysteresis value as the temperature of an electric drive control system including the motor/generator increases.

* * * * *